(12) United States Patent
Hwang et al.

(10) Patent No.: US 8,345,413 B2
(45) Date of Patent: Jan. 1, 2013

(54) APPARATUS FOR CONTROLLING INCLINATION OF ORGANIC LIGHT EMITTING DISPLAY PANEL

(75) Inventors: Jung-Ho Hwang, Yongin (KR); Dong-Su Yee, Yongin (KR); Hyun Hee Lee, Yongin (KR); Dai-Han Cho, Yongin (KR); Min-Su Kim, Yongin (KR); Chan-Kyoung Moon, Yongin (KR); Chan-Hee Wang, Yongin (KR)

(73) Assignee: Samsung Display Co., Ltd., Giheung-Gu, Yongin, Gyeonggi-Do (KR)

( * ) Notice: Subject to any disclaimer, the term of this patent is extended or adjusted under 35 U.S.C. 154(b) by 418 days.

(21) Appl. No.: 12/689,414

(22) Filed: Jan. 19, 2010

(65) Prior Publication Data
US 2010/0208419 A1 Aug. 19, 2010

(30) Foreign Application Priority Data

Feb. 19, 2009 (KR) ........................ 10-2009-0013863

(51) Int. Cl.
*G06F 1/16* (2006.01)
(52) U.S. Cl. ......... 361/679.06; 361/679.21; 361/679.22; 248/917
(58) Field of Classification Search ............. 361/679.06, 361/679.22; 248/130
See application file for complete search history.

(56) References Cited

U.S. PATENT DOCUMENTS

| | | | | |
|---|---|---|---|---|
| 5,638,579 A * | 6/1997 | Tenney | ............................ | 16/338 |
| 6,085,972 A * | 7/2000 | Wright | .......................... | 235/375 |
| 6,430,038 B1 * | 8/2002 | Helot et al. | .............. | 361/679.05 |
| 6,476,884 B1 * | 11/2002 | Shao | ............................... | 349/58 |
| 6,559,829 B1 * | 5/2003 | Matsuo et al. | ................ | 345/156 |
| 6,657,853 B2 * | 12/2003 | Oba et al. | .................... | 312/223.2 |
| 6,918,562 B2 * | 7/2005 | Lee et al. | ....................... | 248/130 |
| 6,954,221 B2 * | 10/2005 | Wu | .......................... | 361/679.21 |
| 7,221,562 B2 * | 5/2007 | Song | ........................ | 361/679.06 |
| 7,387,572 B2 * | 6/2008 | Hanchar | ........................ | 463/46 |
| 7,566,033 B2 * | 7/2009 | Schwager et al. | ......... | 248/125.9 |
| 7,789,362 B2 * | 9/2010 | Choi | .......................... | 248/276.1 |
| 2005/0190533 A1 * | 9/2005 | Hultzman et al. | ............ | 361/683 |
| 2006/0072286 A1 * | 4/2006 | Tseng | ........................... | 361/681 |

(Continued)

FOREIGN PATENT DOCUMENTS
KR 10-0443871 8/2004
KR 10-2006-0042525 5/2006

(Continued)

OTHER PUBLICATIONS

English abstract of KR 10-2003-0053985.
English abstract of KR 10-2005-0089622.

*Primary Examiner* — Anthony Q Edwards
(74) *Attorney, Agent, or Firm* — Robert E. Bushnell, Esq.

(57) ABSTRACT

An apparatus to control an inclination of an organic light emitting display panel, the apparatus including: a rotation pin having a body formed to be angulated; a support including an arm coupled to the rotation pin to support the rotation pin, the arm including a connection hole to support the rotation pin and a stopper provided to protrude under the connection hole; and a rotation part into which the rotation pin is settled in, the rotation part including an adhesion groove corresponding to the stopper and a hooking groove formed on the adhesion groove to control a rotation of the rotation part around the rotation pin, wherein the rotation of the rotation part is limited by a contact between the hooking groove and the stopper.

20 Claims, 3 Drawing Sheets

U.S. PATENT DOCUMENTS

| | | | |
|---|---|---|---|
| 2007/0090233 A1* | 4/2007 | Choi | 248/122.1 |
| 2007/0097610 A1* | 5/2007 | Lee | 361/681 |
| 2007/0121280 A1* | 5/2007 | Yang | 361/681 |
| 2008/0123266 A1* | 5/2008 | Hung | 361/681 |

FOREIGN PATENT DOCUMENTS

| | | |
|---|---|---|
| KR | 10-0577232 | 5/2006 |
| KR | 10-2006-0133857 | 12/2006 |

\* cited by examiner

APPARATUS FOR CONTROLLING INCLINATION OF ORGANIC LIGHT EMITTING DISPLAY PANEL

CROSS-REFERENCE TO RELATED APPLICATION

This application claims the benefit of Korean Patent Application No. 10-2009-0013863, filed Feb. 19, 2009 in the Korean Intellectual Property Office, the disclosure of which is incorporated herein by reference.

BACKGROUND OF THE INVENTION

1. Field of the Invention

Aspects of the present invention relate to an apparatus to control an inclination of an organic light emitting display panel, and more particularly, to an apparatus to control an inclination of an organic light emitting display panel that has a simple structure, increases a supporting force, and reduces material costs.

2. Description of the Related Art

Recently, various flat panel displays with less weight and volume than a cathode ray tube have been developed. A flat panel display includes a liquid crystal display, a field emission display, a plasma display panel, an organic light emitting display, etc. Among these, the organic light emitting display displays an image using an organic light emitting diode (OLED) that generates light by recombination of an electron and a hole generated corresponding to the flow of a current. The OLED includes a light emitting layer of an organic material.

Such an organic light emitting display has various advantages, such as excellent color reproducibility and slimness. Accordingly, applications of the organic light emitting display are expanding to various markets (e.g., a cellular phone, a personal digital assistant (PDA), and a portable multimedia player).

When such an organic light emitting display is used as a monitor, a TV, or the like, there is a need for a panel that is designed to control an inclination thereof according to a position of the monitor, the TV, etc. so that viewers view a screen in an optimum state.

SUMMARY OF THE INVENTION

Aspects of the present invention provide an apparatus to control an inclination of an organic light emitting display panel with a simple structure.

According to an aspect of the present invention, there is provided an apparatus to control an inclination of an organic light emitting display panel, the apparatus including: a rotation pin having an angulated body; a support including an arm coupled to the rotation pin to support the rotation pin, the arm including a connection hole to support the rotation pin and a stopper provided to protrude under the connection hole; and a rotation part into which the rotation pin is settled in, the rotation part including an adhesion groove corresponding to the stopper and a hooking groove provided on the adhesion groove to control a rotation of the rotation part around the rotation pin, wherein the rotation part is limited by a contact between the hooking groove and the stopper.

The arm may include a predetermined gap provided under the connection hole.

The support may be a supporting stand, and the rotation part may be provided on a rear surface of a panel including the organic light emitting display.

According to another aspect of the present invention, there is provided a support apparatus to control an inclination of an organic light emitting display having a rotation part comprising an adhesion groove and a hooking groove, the support apparatus including: a first arm to support a rotation pin fitting into the rotation part around which the rotation part rotates, the first arm comprising a first connection hole to support the rotation pin and a first stopper provided to protrude under the connection hole; and wherein a rotation of the rotation part is limited by a contact between the hooking groove and the stopper.

According to still another aspect of the present invention, there is provided a display apparatus supported by a support including at least one arm comprising a stopper protruding therefrom and a connection hole to support a rotation pin, the display apparatus including: an organic light emitting display; and a first rotation part into which the rotation pin is settled in to support a rotation of the rotation part, the rotation part comprising a first adhesion groove corresponding to the stopper and a second hooking groove formed on the adhesion groove to control the rotation of the first rotation part, wherein the rotation of the rotation part is limited by a contact between the hooking groove and the stopper.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
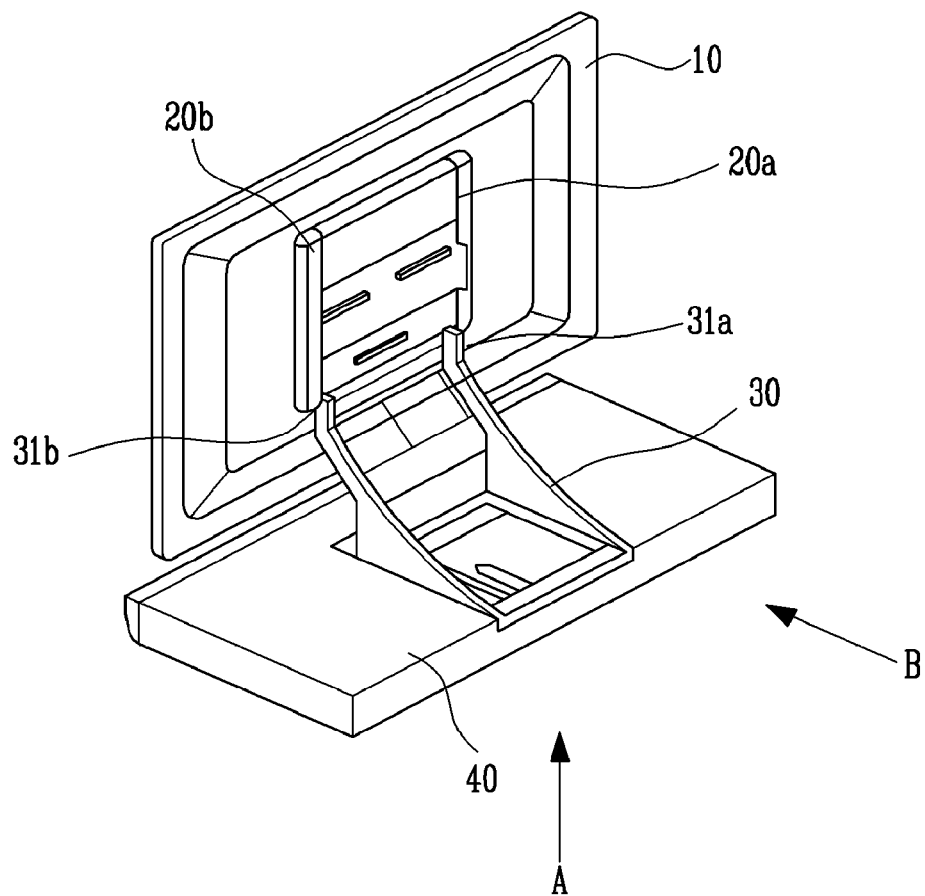
FIG. 1 is a perspective view of an organic light emitting display according to an embodiment of the present invention, seen from a backside.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a perspective view of an organic light emitting display according to an embodiment of the present invention, seen from the backside. Referring to FIG. 1, the organic light emitting display includes a panel 10 that is used as a screen of the organic light emitting display and rotation parts 20a and 20b that are provided on the backside of the panel 10 and coupled to a supporting stand 30.

The rotation parts 20a and 20b are provided on a central portion of the backside of the panel 10. Specifically, a first rotation part 20a and a second rotation part 20b are formed on right and left portions on the center of the panel 10, respectively. The supporting stand 30 coupled to the rotation parts 20a and 20b includes first and second arms 31a and 31b, respectively coupled to the first rotation part 20a and the second rotation part 20b. Accordingly, the panel 10 rotates on the portion where the rotation parts 20a and 20b are coupled to the supporting stand 30 as a shaft. The panel 10 can control an inclination thereof by such rotation. Also, the lower portion of the supporting stand 30 is coupled to a stand 40 to allow the panel 10 to be settled stably, though it is understood that aspects of the present invention are not limited thereto. For example, according to other aspects, the supporting stand 30 may be coupled to a mount to allow the panel 10 to be fixed on a wall or other supporting medium.

Figure 2:
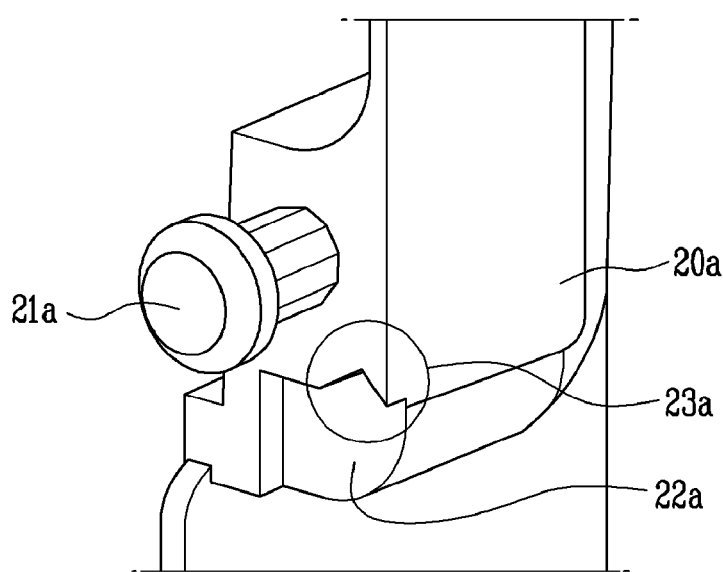
FIG. 2 is a perspective view of a rotation part of FIG. 1, seen from A direction.
Figure 3A:
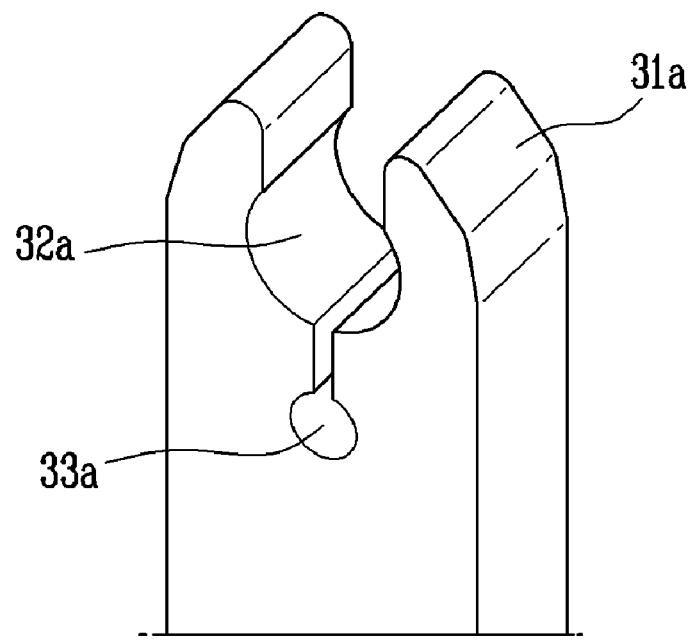
FIG. 3A is a perspective view of an arm of a supporting stand of FIG. 1, seen from A direction.
Figure 3B:
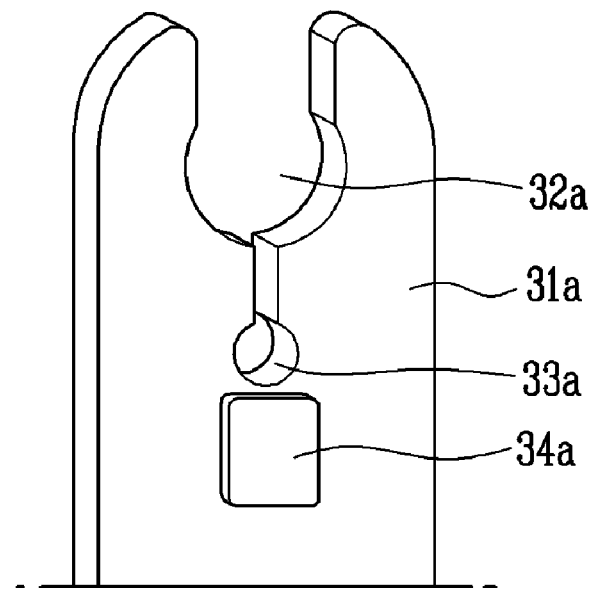
FIG. 3B is a perspective view of the arm of the supporting stand of FIG. 1, seen from B direction.
Figure 4A:
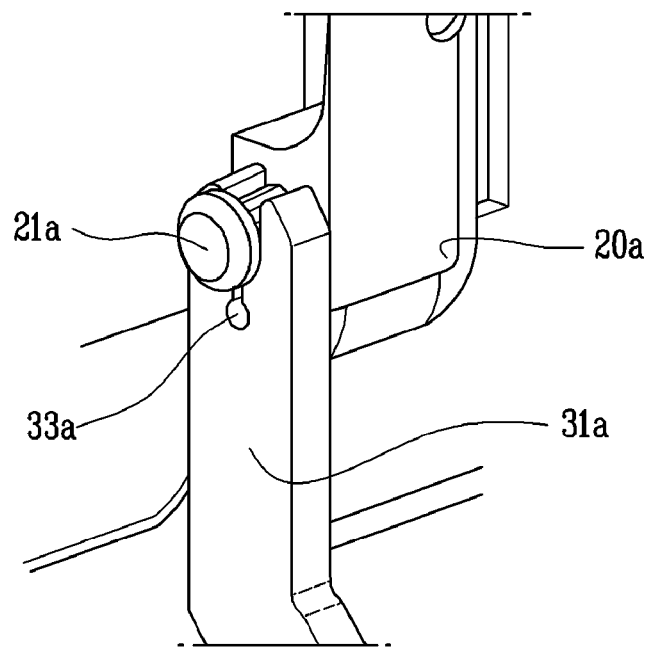
FIG. 4A is a perspective view illustrating the rotation part coupled to the arm of the supporting stand, seen from A direction.
Figure 4B:
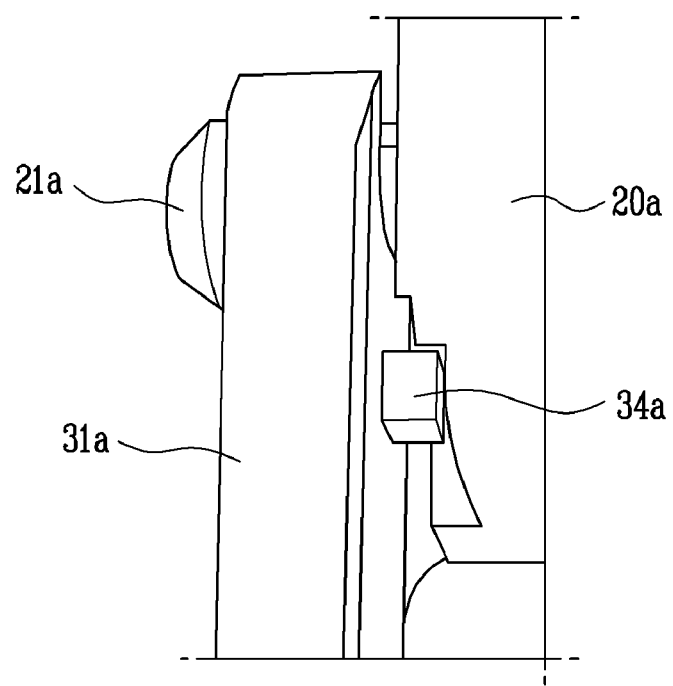
FIG. 4B is a perspective view illustrating the rotation part coupled to the arm of the supporting stand, seen from B direction.

FIG. 2 is a perspective view of the rotation part 20a of FIG. 1, seen from A direction. FIG. 3A is a perspective view of the arm 31a of the supporting stand 30 of FIG. 1, seen from A direction. FIG. 3B is a perspective view of the arm 31a of the supporting stand 30 of FIG. 1, seen from B direction. FIG. 4A is a perspective view illustrating the rotation part 20a coupled to the arm 31a of the supporting stand 30, seen from A direction. FIG. 4B is a perspective view the rotation part 20a coupled to the arm 31a of the supporting stand 30, seen from B direction.

Referring to FIGS. 2 to 4B, the rotation part 20a includes a rotation pin 21a in a screw shape having a head and a body formed in a lower portion thereof. Furthermore, the rotation part 20a also includes an adhesion groove 22a provided under the rotation pin 21a. When the body of the rotation pin 21a has a cylindrical shape, the panel 10 is rotated by gravity when the panel 10 is adjusted to be inclined. Thus, according to an aspect of the present invention, the body of the rotation pin 21a is angulated, thereby limiting the rotation of the rotation pin 21a in the arm 31a of the stand 30 due to the flat surface of the body of the rotation pin 21a. Therefore, the inclination of the panel 10 is changed by the force applied by a user, as opposed to gravity. However, it is understood that aspects of the present invention are not limited to the rotation pin 21a having a cylindrical shape, and may have another shape fitting into the rotation part 20a and the rotation arm 31a according to other aspects. The adhesion groove 22a of the first rotation part 20a includes a hooking groove 23a to thereby determine a maximum rotation angle of the first rotation part 20a coupled to the stand 30 to be rotated.

The rotation arm 31a of the stand 30 includes a connection hole 32a formed in a cylindrical shape, of which an upper portion is open. However, it is understood that aspects of the present invention are not limited to the cylindrical shape, and the connection hole 32a may have another shape corresponding to the rotation part 20a and the rotation pin 21a. A cracked gap 33a is provided in a lower portion of the connection hole 32a to allow the connection hole 32a to widen. For example, when the connection hole 32a is coupled to the rotation pin 21a of the first rotation part 20a, the connection hole 32a can widen so that the arm 31a of the stand 30 can be easily coupled to the rotation pin 21a. Also, according to some embodiments, the thickness of the body of the rotation pin 21a can be larger than the diameter of the connection hole 32a, making it possible to generate more friction force between the rotation pin 21a and the connection hole 32a. Therefore, the inclination of the panel 10 set by the user is not changed due to external action, such as gravity, etc.

The arm 31a of the stand 30 includes a stopper 34a provided under the connection hole 32a to contact the first rotation part 20a. At this time, the adhesion groove 22a of the first rotation part 20a is provided on a position corresponding to the stopper 34a. Accordingly, the stopper 34a defines a rotation space of the first rotation part 20a by the adhesion groove 22a of the first rotation part 20a. The stopper 34a is adhered to the first rotation part 20a by the adhesion groove 22a. At this time, if the stopper 34a is engaged with the hooking groove 23a provided on the adhesion groove 22a, the first rotation part 20a cannot further be rotated. Therefore, the maximum angle that the first rotation part 20a coupled to the arm 31a of the stand 30 can be rotated is limited by the stopper 34a.

Though aspects of the present invention have been described with reference to an organic light emitting display, it is understood that all aspects are not limited thereto. For example, according to other aspects, the display may be a liquid crystal display (LCD), a cathode ray tube (CRT) display, etc.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An apparatus to control an inclination of a display, the apparatus comprising:
   a rotation part attached to the display, the rotation part comprising:
      a rotation pin fixed thereto;
      an adhesion groove disposed below and separate from the rotation pin; and
      a hooking groove formed in the adhesion groove to control a rotation limit of the display;
   a stand;
   a support fixed to and extending from the stand; and
   an arm extending from the support, the arm comprising:
      an connection hole in which the rotation pin is removably inserted; and
      a stopper disposed to protrude from one side of the arm, the stopper being in contact with the adhesion groove and halting rotation of the display when engaged with the hooking groove.

2. The apparatus as claimed in claim 1, the rotation pin having an angulated body.

3. The apparatus as claimed in claim 1, the rotation pin having a bulbous head attached to a polygonal body, the bulbous head having a diameter greater than a diameter of the polygonal body, the polygonal body being fixed to the rotation part.

4. The apparatus as claimed in claim 3, the diameter of the polygonal body being greater than a diameter of the connection hole.

5. The apparatus as claimed in claim 1, the rotation pin having a bulbous head attached to a cylindrical body, the bulbous head having a diameter greater than a diameter of the cylindrical body, the cylindrical body being fixed to the rotation part.

6. The apparatus as claimed in claim 5, the diameter of the cylindrical body being greater than a diameter of the connection hole.

7. The apparatus as claimed in claim 1, a diameter of the rotation pin being greater than a diameter of the connection hole.

8. The apparatus as claimed in claim 1, the angulated body having a diameter larger than a diameter of the connection hole.

9. The apparatus as claimed in claim 1, the stand being a wall mount.

10. The apparatus as claimed in claim 1, the connection hole having an omega shape.

11. An apparatus to control an inclination of a display, the apparatus comprising:
- a rotation part attached to the display, the rotation part comprising:
  - a first rotation pin and a second rotation pin fixed to opposite sides of the rotation part;
  - first and second adhesion grooves disposed below and separate from the first and second rotation pins, respectively; and
  - first and second hooking grooves respectively formed in the first and second adhesion grooves to control a rotation limit of the display;
- a stand;
- a support fixed to and extending from the stand; and
- first and second arms extending from the support, each arm comprising:
  - an connection hole in which corresponding ones of the first and second rotation pins is removably inserted; and
  - a stopper in contact with corresponding ones of the first and second adhesion grooves, each stopper halting rotation of the display when engaged with corresponding ones of the first and second hooking grooves.

12. The apparatus as claimed in claim 11, each of the rotation pins having an angulated body.

13. The apparatus as claimed in claim 12, each of the angulated bodies having a diameter larger than a diameter of the corresponding connection holes.

14. The apparatus as claimed in claim 12, each of the connection holes having a shape corresponding to said angulated shape.

15. The apparatus as claimed in claim 11, each of the rotation pins having a bulbous head attached to a polygonal body, the bulbous head having a diameter greater than a diameter of the polygonal body, the polygonal body being fixed to the rotation part.

16. The apparatus as claimed in claim 15, the diameter of each of the polygonal bodies being greater than a diameter of the corresponding connection holes.

17. The apparatus as claimed in claim 11, each of the rotation pins having a bulbous head attached to a cylindrical body, the bulbous head having a diameter greater than a diameter of the cylindrical body, the cylindrical body being fixed to the rotation part.

18. The apparatus as claimed in claim 17, the diameter of each of the cylindrical bodies being greater than a diameter of the corresponding connection holes.

19. The apparatus as claimed in claim 11, diameters of each of the rotation pins being greater than a diameter of the corresponding connection holes.

20. The apparatus as claimed in claim 11, the stand being a wall mount.

* * * * *